United States Patent [19]
Nishioka et al.

[11] Patent Number: 5,471,963
[45] Date of Patent: Dec. 5, 1995

[54] FUEL INJECTION CONTROL SYSTEM FOR ENGINE

[75] Inventors: Futoshi Nishioka, Hiroshima; Tetsushi Hosokai, Kure; Yasuyoshi Hori, Hiroshima; Kunitomo Minamitani, Kure, all of Japan

[73] Assignee: Mazda Motor Corporation, Hiroshima, Japan

[21] Appl. No.: 187,031

[22] Filed: Jan. 27, 1994

[30] Foreign Application Priority Data

Jan. 29, 1993 [JP] Japan .................. 5-014306
Jan. 10, 1994 [JP] Japan .................. 6-001003

[51] Int. Cl.⁶ ......................................... F02M 51/00
[52] U.S. Cl. ............................... 123/478; 123/682
[58] Field of Search ........................... 123/478, 494, 123/682; 364/431.05, 558, 431.04

[56] References Cited

U.S. PATENT DOCUMENTS

| | | | |
|---|---|---|---|
| 5,136,517 | 8/1992 | Cullen et al. | 364/431.05 |
| 5,159,914 | 11/1992 | Follmer et al. | 123/494 |
| 5,209,205 | 5/1993 | Auracher et al. | 123/478 |
| 5,337,719 | 8/1994 | Togai | 123/478 |
| 5,347,974 | 9/1994 | Togai et al. | 123/682 |

FOREIGN PATENT DOCUMENTS

61-076143  5/1986  Japan ........................ 123/478

Primary Examiner—Raymond A. Nelli
Attorney, Agent, or Firm—Keck, Mahin & Cate

[57] ABSTRACT

A fuel injection control system for an engine includes fuel injection valves, each of which injects fuel to one cylinder a plurality of times during each cycle. The system has an arithmetic device for calculating a required fuel injection amount based on driving conditions and a trailing side injection capability of a trailing side injection time point, a determination device for comparing the required fuel injection amount with the trailing side injection capability and determining which is greater, and a fuel injection controller for setting a leading side injection time point and a trailing side injection time point and setting a leading side injection amount and a trailing side injection amount. The fuel injection controller carries out a fuel injection only at the trailing side injection time point when the required fuel injection amount is not greater than the trailing side injection capability and divides the fuel injection between a fuel injection at the leading side injection time point and a fuel injection at the trailing side injection time point when the required fuel injection amount is greater than the trailing side injection capability.

10 Claims, 8 Drawing Sheets

FUEL INJECTION CONTROL SYSTEM FOR ENGINE

BACKGROUND OF THE INVENTION

1. Field of the Invention

The present invention relates to a fuel injection control system for an engine and, in particular, to a fuel injection control system which injects fuel a plurality of times to each cylinder during each cycle.

2. Description of Related Art

A conventional engine fuel injection control system is disclosed in Japanese Utility Model Laid-Open No. 61-76, 143. This conventional control system provides two fuel injection time points during each cycle of each cylinder of the engine. More specifically, it provides a first injection time point on the leading side and a second injection time point on the trailing side and controls the fuel injection ratio between the first and second injection time points based on the engine load and intake air temperature. As a result, vaporization of the injected fuel is promoted and combustion is stabilized even when the engine load and the intake air temperature vary.

On the other hand, there is known another conventional engine in which fuel consumption is reduced during low engine load by causing a rich air fuel mixture to be present near the ignition plug and a lean air fuel mixture to be present below the rich mixture. This will be referred to as "stratified combustion" in this specification. In an engine adopting stratified combustion, a control system sets a trailing side injection time point which is favorable for the stratified combustion, and a leading side injection time point which is favorable for achieving uniform combustion during high engine load, and controls the fuel injection ratio between the trailing side injection time point and the leading side injection time point based on driving conditions such as the engine load and speed.

The above-mentioned two types of conventional fuel injection control system have to calculate the fuel injection ratio or injection division between the leading side injection time point and the trailing side injection time point based on maps corresponding to the various driving conditions. These system types further have to calculate the injection amounts at the leading side injection time point and the trailing side injection time point based on the above-mentioned ratio in every cycle. As a result, the ratio and injection amount calculations become very complicated, and fuel supply is liable to become less than that required during acceleration and other transient engine operation conditions owing to delays in calculating the injection ratio.

SUMMARY OF THE INVENTION

It is therefore an object of the present invention to provide a fuel injection control system for an engine which enables fuel injection control for injecting fuel at a leading side injection time point and a trailing side injection time point to be conducted simply and with very high precision.

It is another object of the present invention to provide a fuel injection control system for an engine which exhibits improved response in transition regions such as during vehicle acceleration.

It is still another object of the present invention to provide a fuel injection control system for an engine which enables stratified combustion for achieving lean burning and reduced fuel consumption during low load.

These and other objects are achieved, according to the present invention, by providing a fuel injection control system for an engine including fuel injection valves each of which injects fuel to one cylinder a plurality of times during each cycle. The system comprises, arithmetic means for calculating a required fuel injection amount based on driving conditions and a trailing side injection capability of a trailing side injection time point, determination means for comparing the required fuel injection amount with the trailing side injection capability and determining which is greater, and fuel injection control means for setting a leading side injection time point and a trailing side injection time point and setting a leading side injection amount and a trailing side injection amount. The fuel injection control means carries out a fuel injection only at the trailing side injection time point when the required fuel injection amount is not greater than the trailing side injection capability and divides the fuel injection between a fuel injection at the leading side injection time point and a fuel injection at the trailing side injection time point when the required fuel injection amount is greater than the trailing side injection capability.

In a preferred embodiment of the present invention, the arithmetic means calculates the required fuel injection amount to achieve an air fuel ratio that is leaner than the theoretical air fuel ratio in a low load region.

In still another embodiment of the present invention, the system further comprises arithmetic time changing means for advancing the time point at which the trailing side injection is calculated as engine speed increases.

The above and other objects and features of the present invention will be apparent from the following description made with reference to the accompanying drawings relating to preferred embodiments of the present invention.

BRIEF DESCRIPTION OF THE DRAWINGS

In the accompanying drawings:

FIG. 8(a) is a time chart showing a leading side fuel injection time point and a trailing side fuel injection time point in the low engine speed region according to the second embodiment of the present invention while FIG. 8(b) is a time chart showing the same time points in a high engine speed region according to the second embodiment.

DETAILED DESCRIPTION OF THE PREFERRED EMBODIMENTS

The present invention will now be explained with reference to preferred embodiments and the drawings.

A first embodiment of the present invention will first be explained with reference to FIGS. 1–4.

Figure 1:
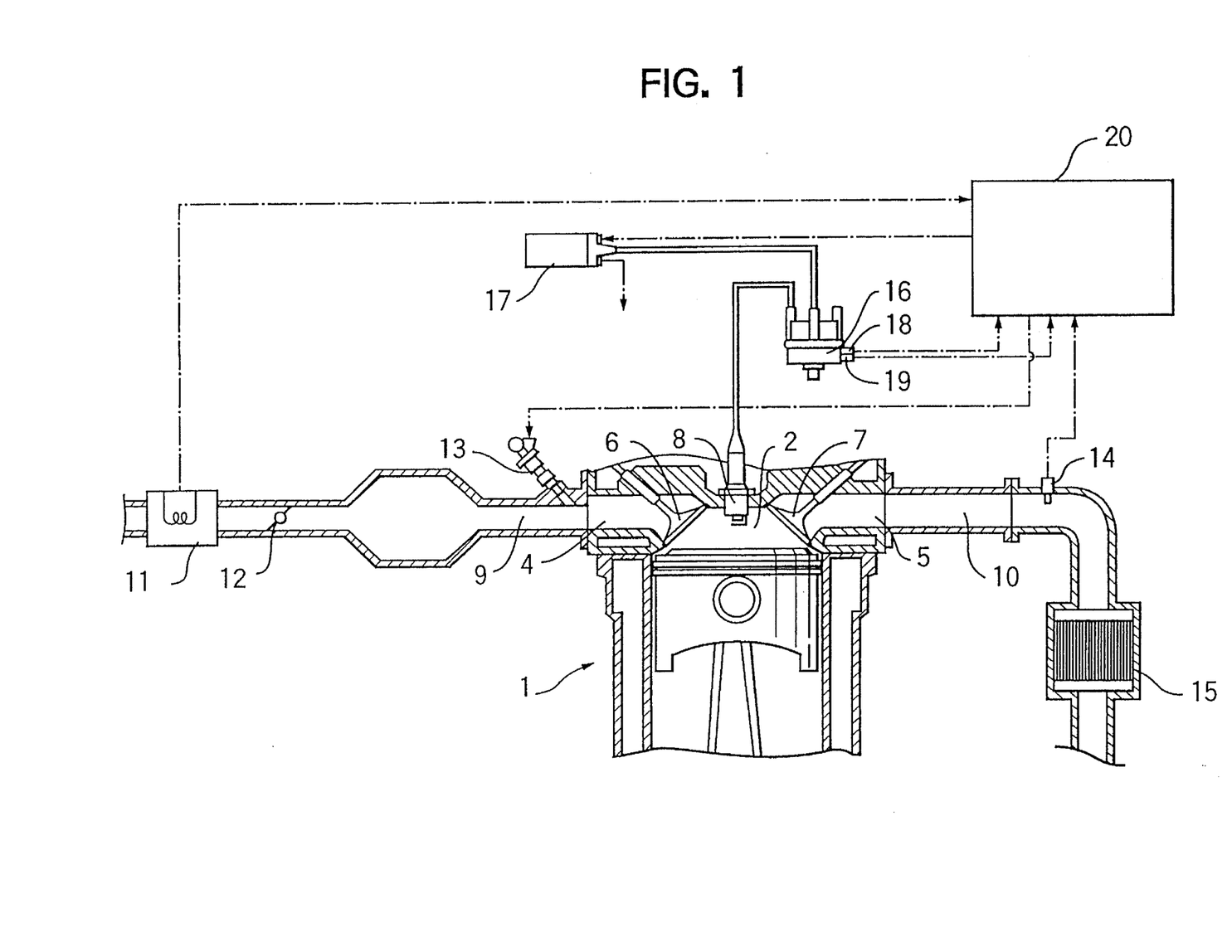
FIG. 1 is a schematic diagram of a fuel injection control system for an engine according to an embodiment of the present invention.

Referring to FIG. 1, each cylinder of a multicylinder engine 1 has a combustion chamber 2 in each cylinder, intake ports 4 and exhaust ports 5 both open to the combustion chamber 2, intake valves 6 provided in the respective intake ports 4, exhaust valves 7 provided in the respective exhaust ports 5 and an ignition plug 8. The intake valves 6 open at 10 degrees before top dead center (TDC) of an intake stroke and close at 10 degrees after bottom dead center (BDC).

An intake passage 9 connected to the intake port 4 is provided with an air flow meter 11 for detecting the intake air amount, a throttle valve 12 operated in response to the operation of an accelerator pedal (not shown), and a fuel injection valve 13 attached near the intake port 4 for injecting fuel into the intake passage 9.

An exhaust passage 10 connected to the exhaust port 5 is provided with a catalytic converter 15 for significantly lowering emission levels of hydrocarbons and the like, and a linear $O_2$ sensor 14 for detecting the air fuel ratio (A/F). The output of the linear $O_2$ sensor 14 changes linearly with the oxygen content in the exhaust gas. The output of the sensor 14 corresponds to the air fuel ratio.

The ignition plug 8 is connected to a distributor 16 and an ignition coil 17. The distributor 16 is equipped with a crank angle sensor 18 which outputs a crank angle signal (a pulse signal) once at every predetermined crank angle. The crank angle signal may, for example, be one that switches ON and OFF near the top dead center (TDC) of the intake stroke in the respective cylinders. An RPM sensor 19 is provided for detecting the engine speed.

Signals from the air flow meter 11, the linear $O_2$ sensor 14, the crank angle sensor 18 and the rotation speed sensor 19 are input to a control unit 20 for controlling the engine. Other signals from a water temperature sensor, an intake air temperature sensor, a throttle opening sensor and the like (not shown) which are necessary for controlling the fuel injection amount are also input to the control unit 20. The control unit 20 includes a microcomputer, and outputs injection pulses to the fuel injection valve 13. Each injection pulse is a signal for controlling the fuel injection amount. The fuel injection valve 13 is controlled to be opened during a time corresponding to the pulse width of the injection pulse. The pulse width of the injection pulse thus corresponds to the fuel injection amount, and the timing of an injection pulse output corresponds to the injection timing.

Figure 2:
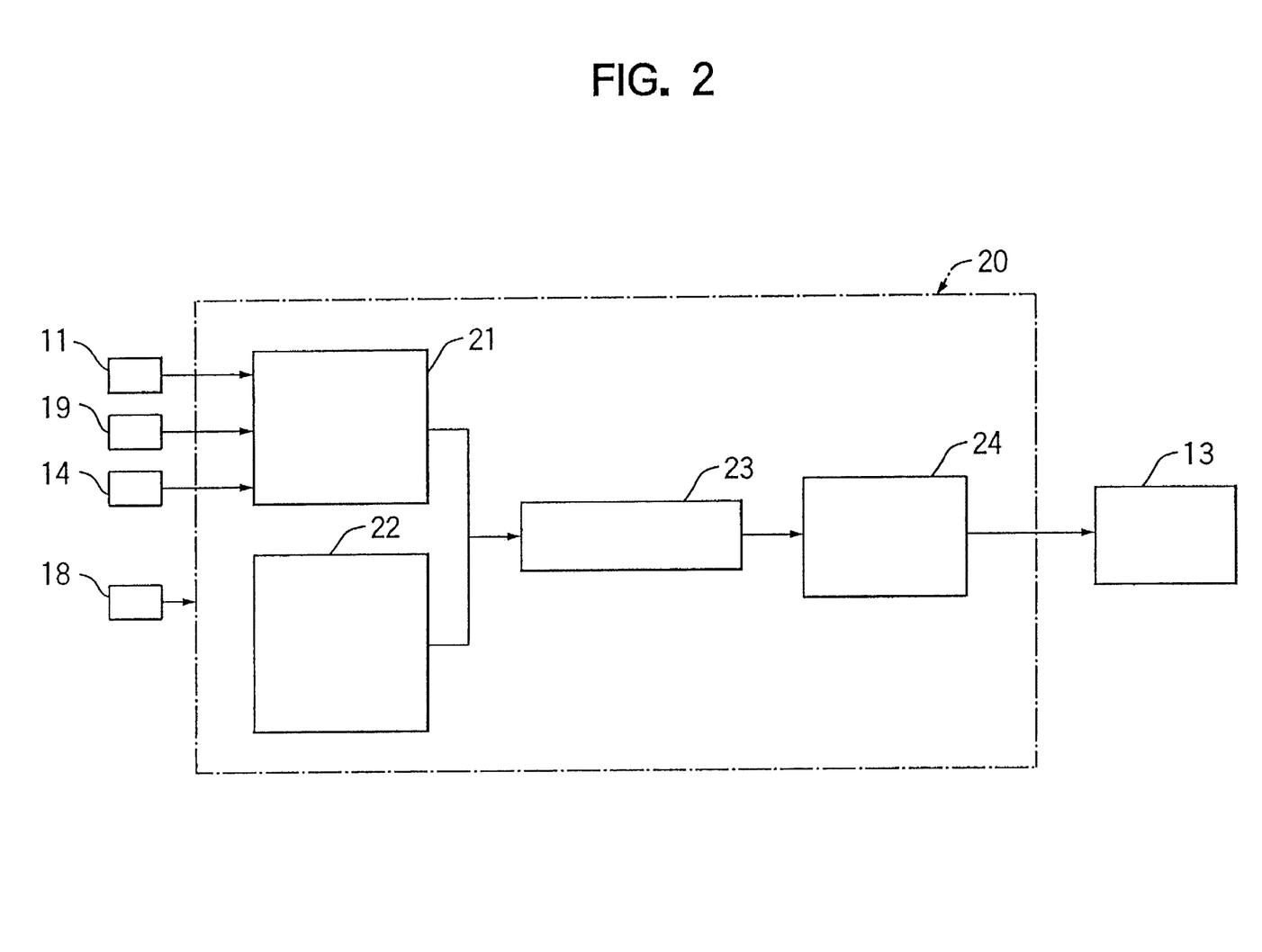
FIG. 2 is a block diagram of a control unit according to a first embodiment of the present invention.

As shown in FIG. 2, the control unit 20 includes a required injection amount arithmetic means 21, a trailing injection capability arithmetic means 22, a determination means 23, and a fuel injection control means 24.

The required injection amount arithmetic means 21 calculates the required fuel injection amount for the driving conditions. More specifically, the means 21 uses signals from the air flow meter 11, the RPM sensor 19 and the like to calculate the injection amount required to obtain a predetermined air fuel ratio. Preferably, the means 21 calculates the required fuel injection amount so as to obtain an air fuel ratio, which is leaner than the theoretical air fuel ratio, in a low engine load driving region. More specifically, the required injection amount arithmetic means 21 first calculates a target air fuel ratio based on the driving conditions, secondly calculates a basic injection amount according to the intake air amount detected by the air flow meter 11 and the engine rotation speed detected by the RPM sensor 19, and finally calculates the required injection amount by feedback control based on a comparison between the target air fuel ratio and the air fuel ratio detected by the linear $O_2$ sensor 14.

The trailing injection capability arithmetic means 22 calculates the amount of injection possible at the trailing side injection time point as described in detail below. The aforesaid calculations are conducted by the arithmetic means 21 and 22 at the time of the leading side injection amount calculation for calculating the amount of injection at the leading side injection time point.

The determination means 23 compares the required fuel injection amount with the trailing injection capability and then determines which is greater. The fuel injection control means 24 establishes two injection time points, one on the leading side and the other on the trailing side, and controls the fuel injection amounts at the respective injection time points. The control means 24 further conducts a fuel injection only of the trailing injection time point when the required fuel injection amount is equal to or less than the injection capability, and carries out fuel injection by dividing the injection into one at a leading side injection time point and another on a trailing side injection time point when the required fuel injection amount is greater than the injection capability.

Figure 3:
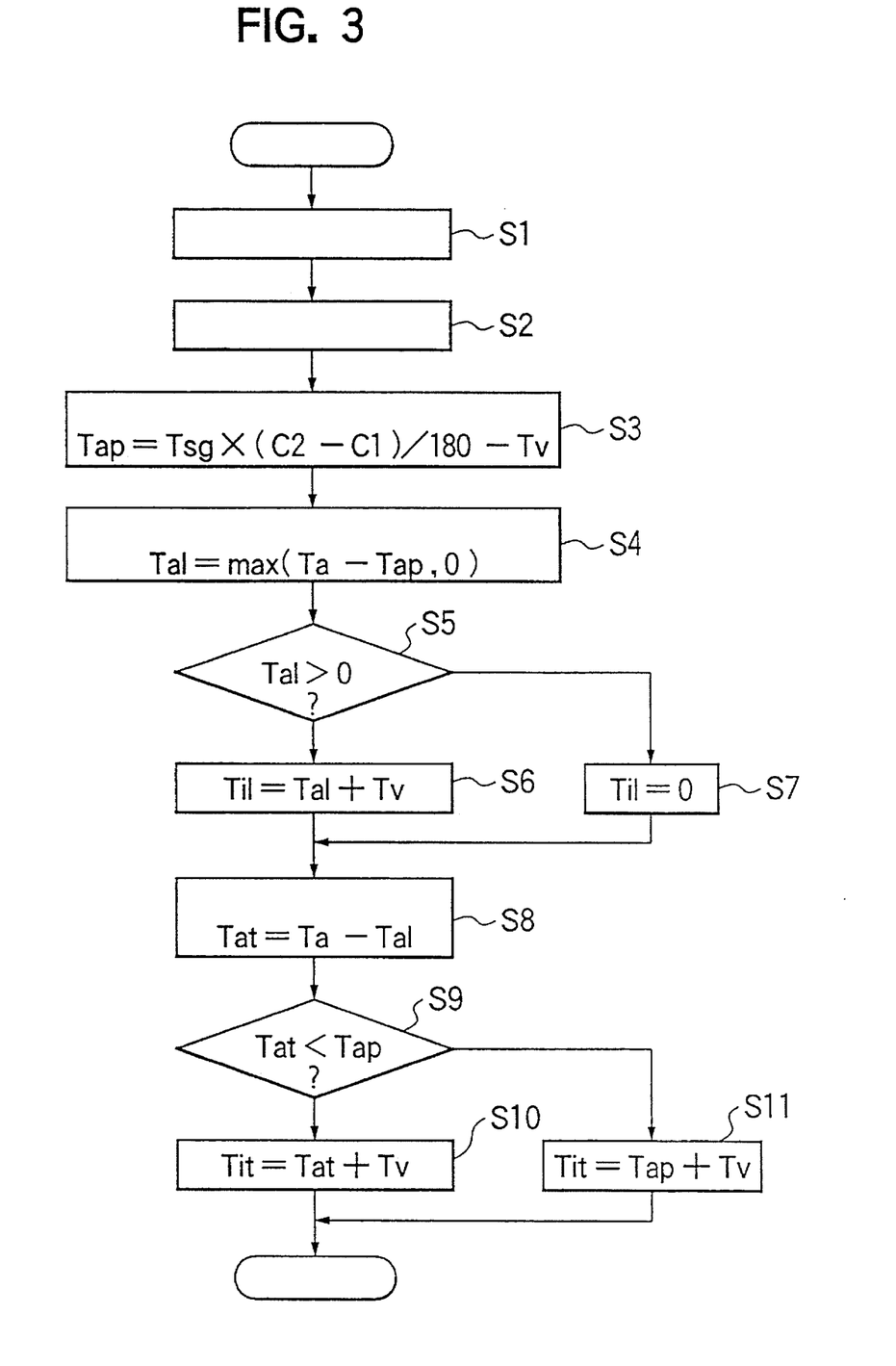
FIG. 3 is a flow chart showing the fuel injection control carried out by a control unit of the first embodiment of the present invention.

FIG. 3 is a flow chart showing the fuel control carried out by the control unit 20 according to the first embodiment of the present invention.

In the control according to FIG. 3, the various signals are input in step S1, and a required injection amount Ta is then calculated based on the intake air amount and the like in step S2. The required injection amount Ta is calculated so as to obtain a lean air fuel ratio in a low engine load driving region.

In step S3, a trailing injection capability Tap is calculated. The trailing injection capability Tap is expressed by the following equation:

$$Tap = Tsg*(C2-C1)/180 - Tv$$

where C1 is a predetermined injection starting angle of the trailing side injection, C2 is the maximum permissible injection termination angle, Tsg is the period of the crank angle signal produced once every 180 degrees of crank angle, and Tv is a reactive injection time determined based on a battery voltage. That is, a permissible trailing injection time period (C2–C1) expressed as a crank angle is converted into a pulse width (time) as $Tsg*(C2-C1)/180$.

In step S4, a leading required injection amount Tal is calculated. The leading required injection amount Tal is determined by a comparison between the required injection amount Ta and the trailing injection capability Tap. That is, the leading required injection amount Tal is determined by selecting the greater one of the difference (Ta—Tap) and zero. The difference (Ta—Tap) becomes the required leading injection amount Tal when the required injection amount Ta is greater than the trailing injection capability Tap, and the required leading injection amount Tal becomes zero when the required injection amount Ta is less than the trailing injection capability Tap or the difference (Ta—Tap) becomes negative.

In step S5, it is determined whether or not the required leading injection amount Tal obtained in step S4 is greater than zero. If the answer is YES in step S5, the pulse width Til of the leading injection is set as the sum of the required leading injection amount Tal and the reactive injection time Tv in step S5 and a fuel injection is carried out using the pulse width Til at the leading side injection time point. On the contrary, if the answer is NO in step S5, the pulse width Til of the leading injection is set to zero in step S7.

Next, in step S8, a required trailing injection amount Tat is calculated. The required trailing injection amount Tat is obtained by subtracting the required leading injection amount Tal from the required injection amount Ta. As a result, the required injection amount Ta becomes the required trailing injection amount Tat when the required injection amount Ta is less than the trailing injection capability Tap (or Til=0), and the trailing injection capability Tap becomes the required trailing injection amount Tat when the required injection amount Ta is greater than the trailing injection capability Tap.

Thereafter, it is determined in step S9 whether or not the required trailing injection amount Tat obtained in step S8 is less than the trailing injection capability Tap. If the answer is YES in step S9, the pulse width Tit of the trailing side injection is set as the sum of the required trailing injection amount Tat and the reactive injection time Tv in step S10. On the contrary, if the answer is NO in step S9, the pulse width Tit of the trailing side injection is set as the sum of the trailing injection capability Tap and the reactive injection time Tv in step S11.

Figure 4:
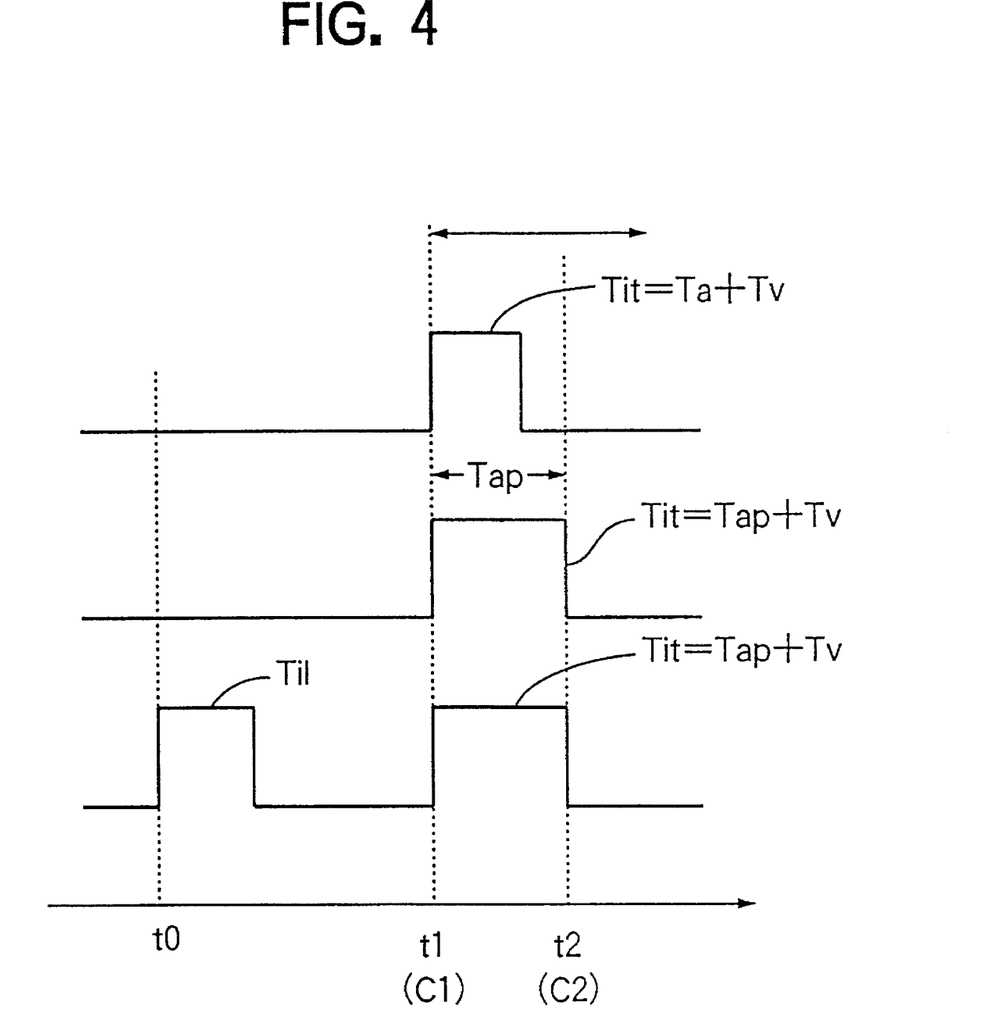
FIG. 4 is a time chart showing a control operation of the control unit according to the first embodiment of the present invention.

FIG. 4 is a time chart showing the aforesaid control operation of the control unit 20 according to the first embodiment of the present invention.

As shown in FIG. 4, the injection starting point to of the leading side injection is set a predetermined time prior to an intake stroke. The injection starting point t1 of the trailing side injection corresponds to an injection starting angle C1 and is set at a time favorable for the stratified combustion, that is, at the top dead center (TDC) of the intake stroke. The injection terminating time point t2 of the trailing side is the maximum permissible time limit corresponding to the maximum permissible injection termination angle C2. After the point t2, fuel cannot be supplied effectively to the combustion chamber.

The required injection amount Ta is compared with the trailing injection capability Tap in steps S3–7 in FIG. 3 at the time point t1 or just before the time point t1.

Then, when the required injection amount Ta is less than the trailing injection capability Tap, that is, under the low engine load, the leading injection amount is set to zero and the pulse width of the trailing injection Tit is set to Ta plus Tv. In other words, at low engine load, the required injection amount Ta is supplied solely by the trailing injection as shown at the top of FIG. 4.

When the required injection amount Ta becomes equal to the trailing injection capability Tap, that is, when the engine experiences a middle load, the trailing injection only is maintained as shown at middle of FIG. 4. As a result, at low and middle engine loads, trailing injection is conducted, which prevents fuel breakup and is favorable for stratified combustion. Further, since the required injection Ta is provided under such engine loads, the air fuel ratio becomes lean. Therefore, the stratified combustion can be obtained in a lean burning and reduced fuel consumption can be achieved.

On the other hand, when the required injection amount Ta becomes greater than the trailing injection capability Tap, that is, under high engine load, the part of the required injection amount Ta which exceeds the trailing injection capability Tap is injected by leading side injection, while the trailing side injection is kept at the trailing injection capability Tap as shown at the bottom of FIG. 4.

According to the first embodiment of the present invention, under high engine load where divided fuel injection is conducted at the leading side injection time point and trailing side injection time point, no complicated calculation is necessary for calculating the division ratio of the fuel injection. As a result, the fuel injection control becomes very easy.

Further, according to the first embodiment of the present invention, the fuel distribution in the combustion chamber is made increasingly uniform as the engine load increases. In the transient regions such the acceleration region where the required injection amount Ta changes rapidly, the required injection amount Ta necessary for providing the leading side injection, the determination based on Ta and Tap, and the fuel injection amounts of both sides are all calculated with good response. As a result, the leading side injection is able to keep up with a rapid increase in the required fuel injection amount, and the fuel supply can be controlled with high accuracy.

A second embodiment of the present invention will now be explained with reference to FIGS. 5–8.

Figure 5:
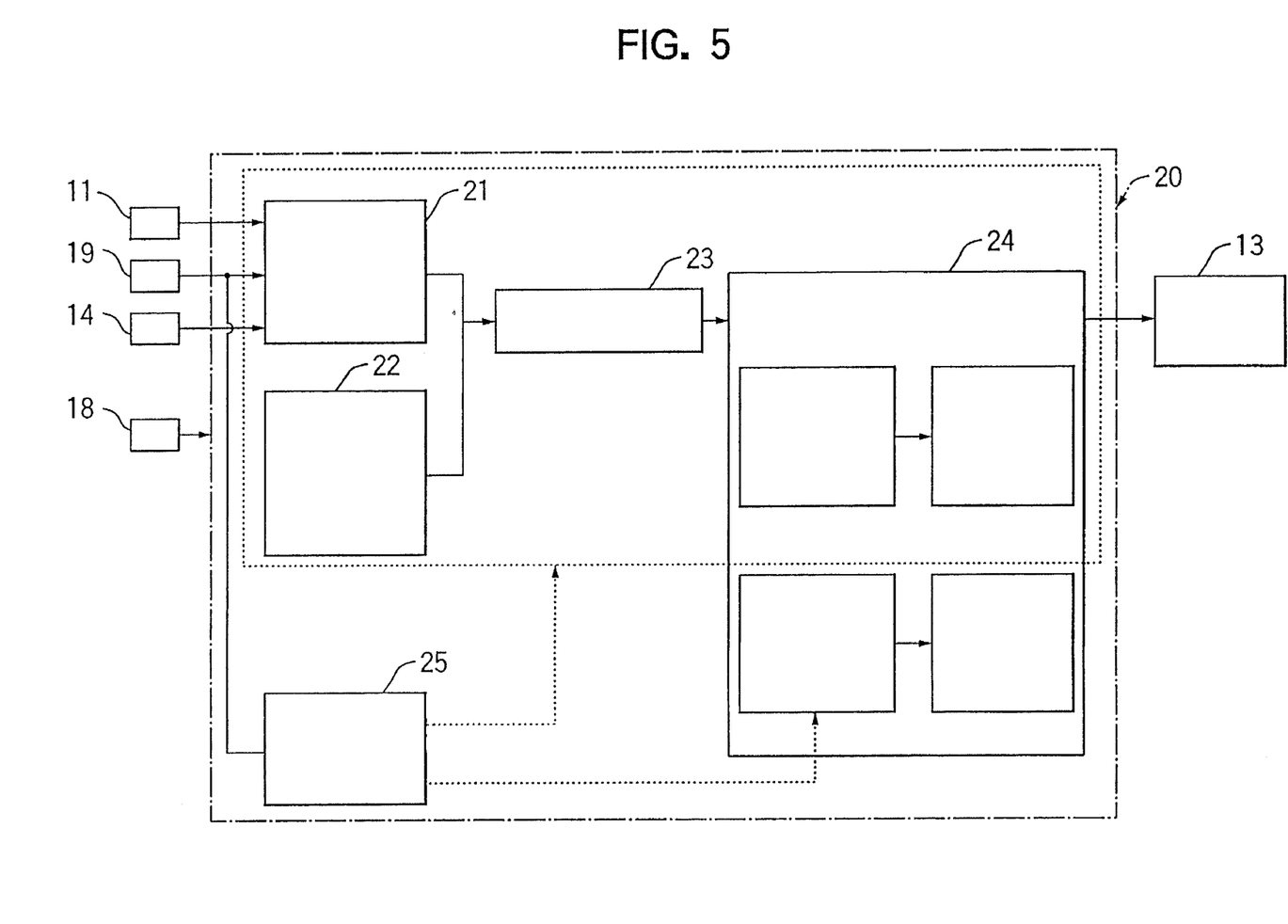
FIG. 5 is a block diagram of a control unit of a second embodiment of the present invention.

Referring to FIG. 5, the control unit 20 includes an required injection amount arithmetic means 21, a trailing injection capability arithmetic means 22, a determination means 23, a fuel injection control means 24, and an arithmetic time changing means 25.

The required injection amount arithmetic means 21, the trailing injection capability arithmetic means 22, and the determination means 23 are the same as those shown in FIG. 2. The fuel injection control means 24 calculates a leading side injection amount at a leading side injection amount calculation time point and carries out the leading side injection based on the calculated injection amount. The means 24 then calculates a trailing side injection amount at a trailing side injection amount calculation time point and carries out the trailing side injection based on the calculated injection amount.

In the second embodiment, fuel injection is conducted only at the trailing side injection time point when the required fuel injection amount is less than the injection capability of the trailing side injection time point, and the fuel injection is divided between the leading side injection time point and a trailing side injection time point when the required fuel injection amount is greater than the injection capability. These fuel injection control operations are the same as those in the first embodiment described below.

The arithmetic time changing means 25 changes the times for calculating the leading side injection amount and the trailing side injection amount based on the engine speed so that the calculating times are set earlier when the engine is operated at high speed than when it is operated at low speed.

Figure 6:
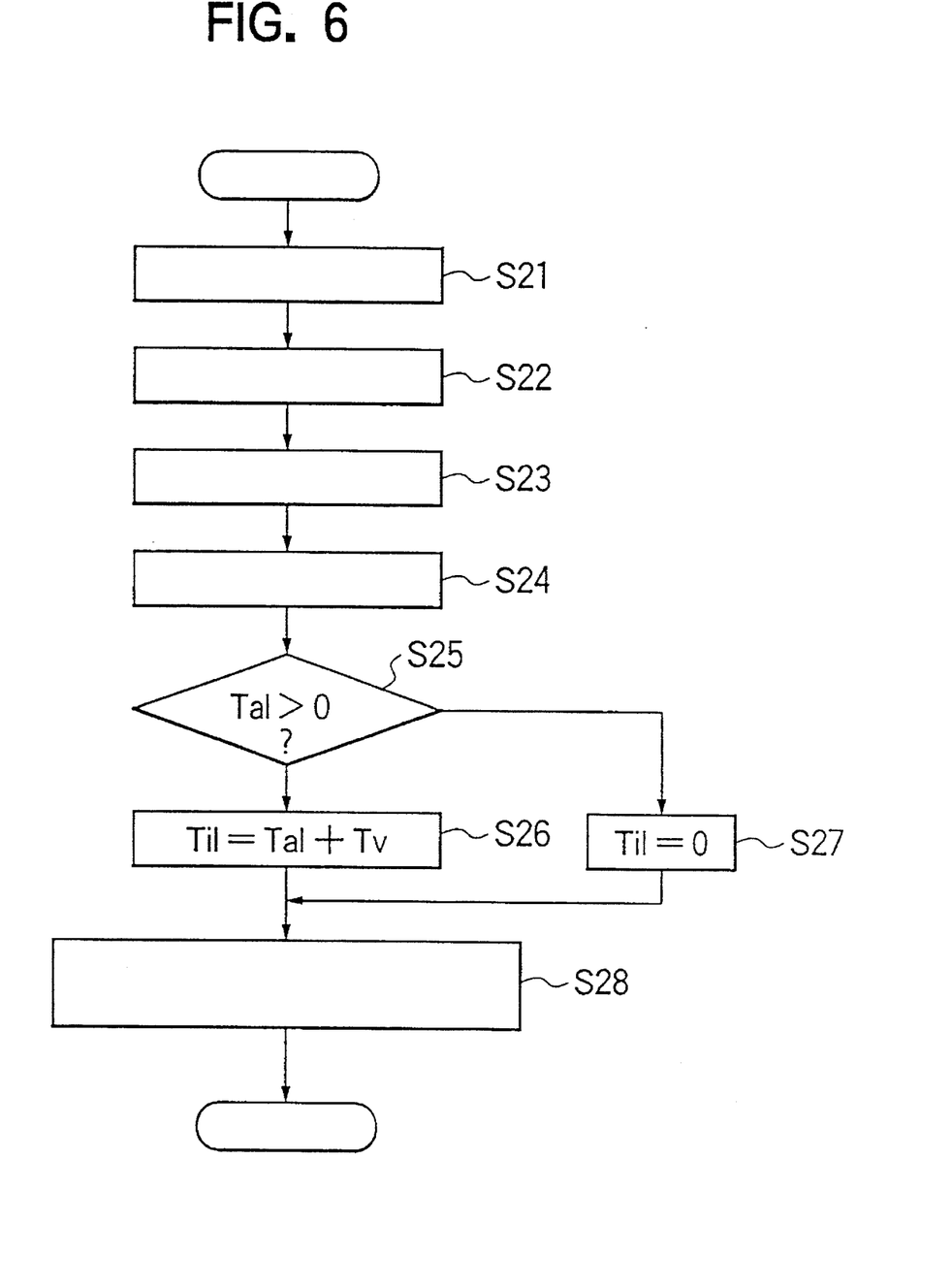
FIG. 6 is a flow chart showing a leading side arithmetic routine according to the second embodiment of the present invention.
Figure 7:
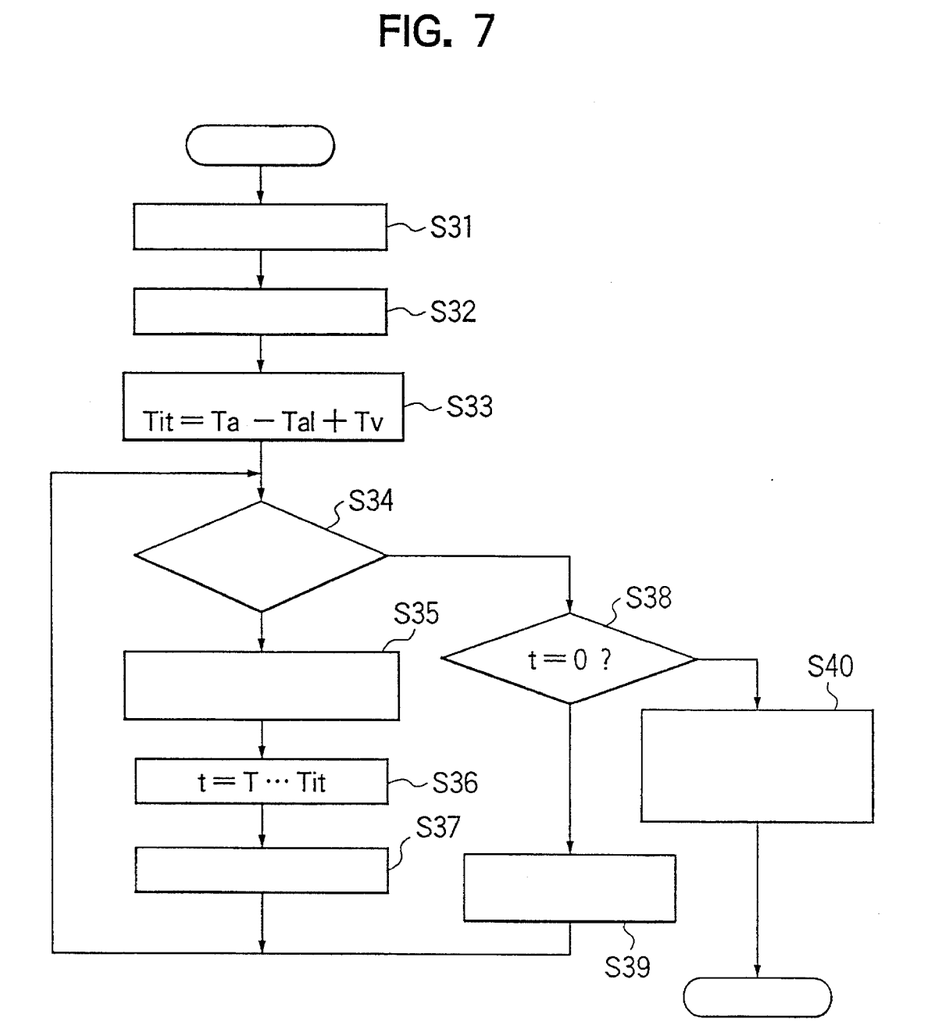
FIG. 7 is a flow chart showing a trailing side arithmetic routine according to the second embodiment of the present invention.

FIG. 6 is a flow chart showing the routine for the leading side calculation according to the second embodiment of the present invention, and FIG. 7 is a flow chart showing the routine of the trailing side calculation according to the same embodiment. FIG. 8(a) is a time chart showing the fuel injection timing in a low engine speed region below a predetermined level such as 1250 rpm, and FIG. 8(b) is a time chart showing the fuel injection timing in a high engine speed region above the predetermined speed. In FIGS. 8(a) and 8(b), A1, A2 and A3 are the times when the signal from the crank angle sensor switches from high to low. The time A1 is 366 degrees before top dead center (TDC) of the intake stroke, the time A2 is 186 degrees before top dead center (TDC) of the intake stroke and the time A3 is 6 degrees before top dead center (TDC) of the intake stroke.

Figure 8:
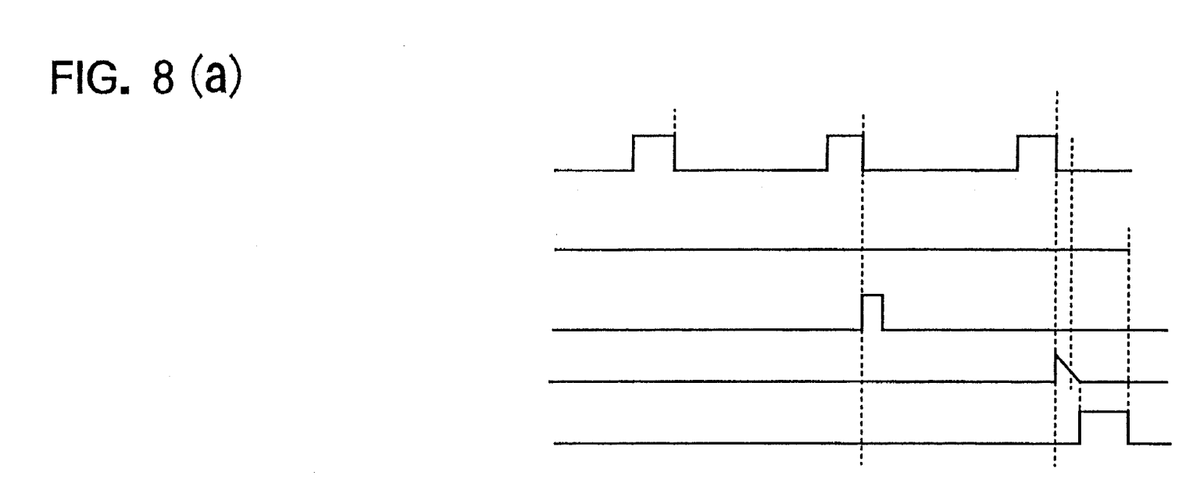

As shown in FIG. 8, the leading side calculation routine and the trailing side calculation routine start at one of the times A1, A2 and A3, and their starting times in the low engine speed region differ from those in the high engine speed region. That is, in the low engine speed region, the leading side calculation routine starts at the time A2 and the trailing side calculation routine starts at the time A3, while, in the high engine speed region, the leading side calculation routine starts at the time A1 and the trailing side calculation routine starts at the time A2.

As shown in FIG. 6, after the leading side calculation routine has started, steps S21–S27 are carried out in the same manner as the steps S1–S7 in FIG. 3. More specifically, the various signals are input in step S21, the required injection amount Ta is calculated in step S22, the trailing injection capability Tap is calculated in step S23, the required leading injection amount Tal is calculated in step S24, and the pulse width of the leading injection Til is calculated differently in step S25–27 depending on whether the required leading injection amount Tal is or is not greater than zero. Thereafter, the leading side fuel injection is carried out at the pulse width Til in step 28. If the pulse width Til is zero, the leading side fuel injection is not carried out.

As shown in FIG. 7, after the trailing side calculation routine has started, the various signals are input in step S31. In step S32, the required injection amount Ta is obtained by feedback control employing a basic injection amount and the output of the linear $O_2$ sensor. Although the required injection amount has already been calculated in step S22 of the leading side calculation in FIG. 6, the required injection amount Ta is preferably calculated again in the trailing side calculation routine so as to improve accuracy because the intake air amount and the like may have changed before the trailing side calculation routine starts.

Next, in step S33, the pulse width of the trailing side injection Tit is calculated by subtracting the required leading injection amount Tal from the required injection amount Ta and adding the reactive time Tv to the result. In step S33, the pulse width Tit may be obtained by employing steps S9–S11 of FIG. 3.

In the second embodiment of the present invention, the starting time of the trailing side injection is controlled so that the trailing side injection terminates at a predetermined constant time point such as 60 degrees after the top dead center (TDC) of intake stroke. That is, it is determined in step S34 whether or not a timer for setting an injection starting time has already been set. If the answer in NO, control passes to step S35 where the crank angle between 6 or 186 degrees before the top dead center (TDC) of intake stroke and 60 degrees after top dead center (TDC) of the intake stroke is converted to a time T. Six degrees before top dead center (TDC) of the intake stroke is the trailing side injection amount calculation time point in the low engine speed region, and 186 degrees before top dead center (TDC) of the intake stroke is the corresponding time point in the high engine speed region. Thereafter, a time t is obtained by subtracting the pulse width Tit from the time T in step S36, and the time t is set in the timer in step S37.

After the timer has been set in step S34, the timer continues to be decremented in steps S39 and S39 until it reaches zero. When the timer reaches zero, the trailing side fuel injection is carried out in step S40.

In the second embodiment, when the required injection amount can be supplied by the trailing side injection, only the trailing side injection is carried out. Further, when the required injection amount is greater than the injection capability, the part of the required injection amount exceeding the injection capability is divided out and injected by leading side injection. As a result, the calculation of the injection amount becomes easy and stratified combustion at a lean air fuel ratio is carried out effectively. These effects are the same as the first embodiment.

Further, in the second embodiment, the injection amount calculation time points for the leading side and the trailing side are adjusted to different values between the low and high engine speed regions.

In order to effectively carry out the stratified combustion, it is necessary to make the trailing side fuel injection terminate at a predetermined time point in the course of the intake stroke and to ensure that the trailing side fuel injection time period available after the trailing side injection amount is calculated is sufficient for the required fuel injection amount in a low engine load. If the trailing side injection amount is calculated too early, then the fuel injection control is not carried out accurately because the intake air amount and the like change between the injection amount calculation time point and the actual fuel injection. Therefore, according to the second embodiment of the present invention, in the low engine speed region, the trailing side injection calculation time point is as far possible while still ensuring that the adequate trailing side injection time period point can be secured, and the leading side injection amount is calculated a predetermined time before the trailing side injection amount calculation time point.

On the other hand, in the high engine speed region, if the injection amount calculation time point is the same as that in the low engine speed region, the time period between the trailing side injection amount calculation time point and the trailing side fuel injection termination point becomes short in absolute length, and therefore the trailing injection capability is reduced. Since this means that not all of the required injection amount can be met by the trailing side injection even in the low load region, a stratified combustion is impaired. According to the second embodiment of the present invention, as shown in FIG. 8(*b*), the leading side injection amount calculation time point is advanced in the high engine speed region in comparison with that in the low engine speed region so as to ensure sufficient trailing injection capability in the high engine speed region. Further, the trailing side injection amount calculation time point is also further advanced in line with the advance of the leading side injection amount calculation time point.

According to the second embodiment, as shown in steps S34–S40 in FIG. 4 and FIG. 8, the time difference between the time period corresponding to the trailing side injection capability and the time period corresponding to the actual trailing injection amount is set in a timer, and the trailing side injection starting time point is adjusted. That is, the trailing side injection termination time point is set at a predetermined constant time point such as 60 degrees after a top dead center, and therefore the trailing side injection starting time point is delayed as the fuel injection amount becomes small. As a result, the stratified combustion is carried out effectively in the low load region.

Also according to the second embodiment, the leading side and trailing side injection amount calculation time points and the trailing side injection termination time point may, depending on the engine conditions, be set at other degrees than those shown in FIGS. 7 and 8.

Also according to the second embodiment, the leading side and the trailing side injection amount calculation time points may be set at earlier times as the engine speed increases.

While the present invention has been illustrated by means of several preferred embodiments, one of ordinary skill in the art will recognize that modifications and improvements can be made while remaining within the spirit and scope of the invention. The scope of the invention is determined solely by the appended claims.

What is claimed is:

1. A fuel injection control system for an engine comprising:

fuel injection valves, each of which injects fuel into one cylinder of said engine a plurality of times during each cycle;

sensors for detecting driving conditions and generating output signals representing said driving conditions; and control means for (1) calculating a required fuel injection amount, based on said driving conditions, and a trailing side injection capability of a trailing side injection time point, (2) comparing the required fuel injection amount with the trailing side injection capability and determining which is greater, (3) setting a leading side injection time point, a trailing side injection time point, a leading side injection amount and a trailing side injection amount, (4) controlling said fuel injection valves so as to carry out fuel injection only at the trailing side injection time point when the required fuel injection amount is not greater than the trailing side injection capability and so as to divide the fuel injection between a fuel injection at the leading side injection time point and a fuel injection at the trailing side injection time point when the required fuel injection amount is greater than the trailing side injection capability.

2. A fuel injection control system according to claim 1, wherein said control means calculates the required fuel injection amount so as to achieve an air fuel ratio that is leaner than a theoretical air fuel ratio in a low load region.

3. A fuel injection control system according to claim 1, wherein said control means further advances the trailing side injection time point calculation as engine rotation speed increases.

4. A fuel injection control system according to claim 1, wherein said control means calculates the required fuel injection amount prior to the fuel injection at the leading side injection time point and the fuel injection at the trailing side injection time point.

5. A fuel injection control system according to claim 1, wherein said control means calculates the trailing side injection capability by the following equation:

$$Tap = Tsg * (C2-C1)/180 - Tv$$

where Tap is the trailing side injection capability, Tsg is a period of a crank angle signal produced after every 180 degrees of crank angle, C1 is a predetermined injection starting angle of the trailing side injection, C2 is a maximum permissible injection termination angle and Tv is a reactive injection time.

6. A fuel injection control system according to claim 1, wherein said control means sets a time point for terminating the trailing side injection so that the trailing side injection terminates while an intake valve of the engine is open.

7. A fuel injection control system according to claim 6, wherein said control means sets the time point for terminating the trailing side injection so that the trailing side injection terminates at a predetermined constant time point while the intake valve of the engine is open.

8. A fuel injection control system according to claim 1, wherein said control means calculates the required fuel injection amount by carrying out a feedback control to achieve a target air fuel ratio.

9. A fuel injection control system according to claim 1, wherein said control means calculates the required fuel injection amount at a time point for calculating the leading side injection amount.

10. A fuel injection control system according to claim 9, wherein said control means further calculates the required fuel injection amount at a time point for calculating the trailing side injection amount.

* * * * *